(12) United States Patent
Masten, Jr.

(10) Patent No.: US 10,682,585 B2
(45) Date of Patent: Jun. 16, 2020

(54) HIGH-EFFICIENCY SLUDGE DEHYDRATOR USING AN ADAPTIVE MECHANICAL VAPOR RE-COMPRESSION PROCESS

(71) Applicant: James William Masten, Jr., Seattle, WA (US)

(72) Inventor: James William Masten, Jr., Seattle, WA (US)

( * ) Notice: Subject to any disclaimer, the term of this patent is extended or adjusted under 35 U.S.C. 154(b) by 170 days.

(21) Appl. No.: 15/648,008

(22) Filed: Jul. 12, 2017

(65) Prior Publication Data

US 2019/0015760 A1 Jan. 17, 2019

(51) Int. Cl.
| | | |
|---|---|---|
| *B01D 1/00* | (2006.01) |
| *B01D 61/36* | (2006.01) |
| *B01D 3/00* | (2006.01) |
| *C02F 1/04* | (2006.01) |
| *C02F 1/16* | (2006.01) |
| *C02F 1/00* | (2006.01) |
| *B01L 3/00* | (2006.01) |

(52) U.S. Cl.
CPC ......... *B01D 1/0017* (2013.01); *B01D 1/0094* (2013.01); *B01D 3/007* (2013.01); *B01D 61/36* (2013.01); *C02F 1/048* (2013.01); *C02F 1/16* (2013.01); *B01L 3/00* (2013.01); *C02F 1/00* (2013.01)

(58) Field of Classification Search
USPC ........ 203/39, 47, 73; 159/24.1, 29, 46, 47.3; 210/634, 770
See application file for complete search history.

(56) References Cited

U.S. PATENT DOCUMENTS

| | | | | |
|---|---|---|---|---|
| 4,303,468 A * | 12/1981 | Laguilharre | ......... | B01D 1/2846 159/47.1 |
| 5,076,895 A * | 12/1991 | Greenfield | ............... | B01D 1/26 203/10 |
| 5,518,621 A * | 5/1996 | Holcombe | ................ | B09C 1/02 210/634 |
| 8,808,419 B2 * | 8/2014 | Zhong | .................. | C02F 11/122 71/12 |
| 9,327,997 B1 * | 5/2016 | Kuper | ..................... | C02F 1/048 |
| 9,364,837 B2 * | 6/2016 | Yamaguchi | ............... | B04B 1/20 |
| 9,381,711 B2 * | 7/2016 | Oh | ............................. | B30B 9/14 |
| 2017/0028310 A1 * | 2/2017 | Zimmer | .................. | C02F 1/041 |
| 2017/0267565 A1 * | 9/2017 | Wang | ....................... | C02F 9/00 |

* cited by examiner

Primary Examiner — Nina Bhat (57) ABSTRACT

A unique adaptive method of Mechanical Vapor Re-compression (MVR) to dehydrate abrasive sludge to a dry, sterile state that is nearly moisture free while maintaining extremely high process efficiencies by adaptively tuning the system parameters related to the varying specific plus latent heats of the input feedstream. This Adaptive MVR (AMVR) process is supported by the effective use of a unique method and apparatus for the optimization of the conductive heating process as applied to a range of sludge consistencies.

20 Claims, 9 Drawing Sheets

HIGH-EFFICIENCY SLUDGE DEHYDRATOR USING AN ADAPTIVE MECHANICAL VAPOR RE-COMPRESSION PROCESS

BACKGROUND OF THE INVENTION

Throughout history, wastewater has been an unavoidable consequence of man's existence on the earth, and one which has been compounded by the growth of the human population, the development of an industrial society and the exploitation of fossil fuels.

Some of the most challenging problems in the world today are the large volumes of contaminated water that are part of the waste streams of rural and urban societies. These waste streams exist in large volumes in every established and emerging setting in the world. Typical are the United States and China, both having nearly insurmountable problems processing Municipal Solid Waste, biological or sewer wastewater and industrial waste while exhausting their supplies of potable or fresh water.

As can be seen by the most recent United States patent filings which come from all over the world's developed and emerging societies, there is an extreme focus on dewatering sludge of various types, from sewer sludge to industrial waste sludge to oil field sludge.

Yongfeng He, in his Oct. 23, 2013, U.S. Pat. No. 8,561,319 B2, disclosed a system that uses a series of centripetal fans to accelerate raw wet sludge that has been driven through hammer wheels to reduce the particle size to collide with previously dehydrated sludge which is now a dry powder. The resulting product is allowed to settle in a room where the air is vented away. If there is a requirement for very dry powder, then this process is repeated up to three times. This system is a fully automated system designed to operate continuously.

Very few months after Mr. He's patent, Ming Lu was granted U.S. Pat. No. 8,691,094 B2 for teaching a method of simultaneously processing Organic Municipal Solid Waste and municipal sewage in a process where the combined inner process products are used to increase the effectiveness of the process. Lu's patent discloses a mechanically enhanced biological process.

Huansheng Zhong's U.S. Pat. No. 8,808,419 discloses a method that prescribes conditioning cycles using both organic agents and an inorganic agent of $Fe^{3+}$. The mixture is mechanically dehydrated in a press. The clumps are forcibly broken up and then dried using air as the mixture is mechanically turned over. The resulting exothermic reaction drives the moisture out of the sludge, after which the mixture can be sterilized by various methods.

Richard Kuper in his U.S. Pat. No. 9,327,997 B1 presents a method of using a vacuum to depress the boiling point of the water in the sludge which is moved through an apparatus with rotary meter vacuum valves. The vaporized water is condensed down process and the heat of condensation is captured and used to heat the incoming sludge prior to entering the evaporation stage.

In contrast, Kaoru Yamaguchi's U.S. Pat. No. 9,364,837 B2 uses a centripetal device to remove moisture by centrifugal forces. The specific feature of this horizontal straight drum is the improvement of two different tapered sections plus the addition of an inorganic flocculent injection system. The straight drum flows into a gently tapered section, which flows into a much steeper tapered section where a build-up of cake creates a resistance path adding another dimension to the compression of the cake. According to Mr. Yamaguchi, his apparatus and the improved method of implementation greatly improve the moisture reduction over existing processes and machines.

In U.S. Pat. No. 9,381,711 B2, Jeong Oh presents a novel screw compressor dehydrating device which essentially slices the wet sludge in advancing microscopic increments with the goal of rupturing the physical structure of the microbes that physically make up the principal mass of the sewer sludge material. The water content of the sludge is trapped inside the physical structure of the microbes. Rupturing them releases the water.

Inventor Artur Zimmer, in his US Patent application number US 2017/0028310 A1, presents a mobile mechanical vapor recompression system targeting the reduction of Total Dissolved Solids (TDS) in wastewater (e.g., frac water) through a reduced-pressure distillation process. This system targets TDS in the range of 150,000 mg/L and produces concentrate product in the 200,000 to 300,000 mg/L range. The goal is a condensate product with TDS below 300 mg/L. A Mechanical Vapor Re-compression system is presented that solves the problem of the rising concentrate boiling point as the TDS increases. The system can split into two systems and dilute the concentrate with additional intake wastewater.

Each of these referenced patents presents a clearly different approach to the dehydration challenge of wastewater and/or sludge drying. Their reference is important to present as background to this inventor's disclosure of this unique thermal energy transfer method and supporting dehydrator apparatus.

Although the referenced patents are a survey of the state-of-the-practice, none of them apply Mechanical Vapor Re-compression (MVR) to the process of drying sludge when the moisture content of the sludge is less than about 85%. In fact, an extensive survey of operational systems reported in the popular literature has not revealed the use of MVR technologies when the moisture content is less than about 96%. This disclosure presents a method that exploits the highly efficient MVR process applied "adaptively" to sludge dehydration with moisture contents of the input feed material from 99% to less than 20%; yet the system is designed to output material with moisture contents of less than 5%.

Most common forms of waste material are laden with liquid. Such materials may be mud composed of water and soil, petroleum sludge composed of water and petroleum solids and (probably) soil and sewer sludge composed of animal and/or human waste and water.

Currently, the most efficient process for extracting a highly homogenous product from a liquid composed of suspended solids, some dissolved materials and/or some highly absorbent organic material is reverse osmosis using the rapidly advancing membrane technology. But membrane filters, polymer or ceramic, are only useful if the fluid is nearly homogenous with a small solids component. Clogging and scheduled maintenance intervals drive up costs and limit equipment availability.

The energy use is an issue when processing sludge-like materials, as the typical process in use worldwide is to apply energy as mechanical force, such as a screw compressor or a centrifuge, to reduce the moisture in the sludge before subjecting the sludge (which still contains as much as 80% water) to an evaporative cycle. Typical thermal processes involve heating at environmental atmospheric pressure to evaporate the remaining water or depositing the sludge on the ground and letting it dehydrate naturally, ignoring the potential for harm due to possible biological components.

All known MVR technologies as applied to water-based waste streams are designed around the specific heat and latent heat of a feedstream that is more than 96% water. The disclosure herein reveals a method and a supporting apparatus that adaptively reconfigure the key operational parameters of a Mechanical Vapor Re-compression (MVR) process to appropriate values for optimized processing based on the composite specific heat and the mass of the input feedstream, the latent heat of the liquid component of the feedstream and the boiling point of that liquid.

The spawn of urbanization and industrialization include not only waste products such as Municipal Solid Waste (MSW) which is typically between five and forty percent water, but other bio-solids, including sewer sludge, agricultural waste, wood waste, food waste, slaughterhouse waste and even fish processing waste, among others which all typically contain a significant liquid component.

The Adaptive Mechanical Vapor Re-compression (AMVR) process disclosed herein has the potential to save energy by improving the efficiency of many industrial processes that involve removing the liquid component from a composite semi-solid with a sludge-like consistency.

It is the current state of the practice and common in utility fields for the system designs and the build methods to involve large steel (thermal conductivity of approximately 42 W/m-C.°) or stainless steel (thermal conductivity of approximately 16 W/m-C.°) tanks with high water (thermal conductivity of approximately 0.58 W/m-C.°) volumes, all of which are barriers to heat flow. The improved method disclosed herein of heating to vaporize the liquid component in sludge material involves a manipulation of the Ideal Gas Law (i.e., PV=nRT) and an apparatus optimized for thermal conductivity so constructed as to minimize the heat flow path through the composite or sludge material itself.

BRIEF SUMMARY OF THE INVENTION

The Dehydrator System disclosed herein is a non-vented, continuous flow, optimized process for the extraction and treatment of liquid from sludge or semi-solid material. This system includes the method of a continuously flowing Adaptive Mechanical Vapor Re-compression (AMVR) process that lowers the pressure on the liquid-laden semi-solid material (i.e., sludge) as the material is mechanically compressed against the walls of a heated evaporation chamber. The pressure is depressed to a point where the boiling point of the liquid component of the semi-solid material is significantly lower than the boiling point at one atmosphere of pressure. The vapor is transported to a condensation chamber through a ducted re-compression fan/pump, which raises the pressure in the condensation chamber to a calculated differential pressure relative to the evaporation chamber, thereby heating the vapor to add "make-up" energy compensation for system-wide inefficiencies and thermal losses. The vapor at the higher temperature of the condensation chamber dew point condenses and gives up its latent plus make-up heat to the heat exchanger/condenser. The heat exchanger/condenser transfers the thermal energy to the liquid thermal energy transport medium flowing through the heat exchanger/condenser. The thermal energy transfer fluid heated to a temperature above the depressed boiling point of the liquid component of the sludge is supplied to a heat exchanging jacket of the heated evaporation chamber to transfer thermal energy from the thermal energy transfer fluid to the highly thermally conductive walls of the heated evaporation chamber. In addition, the process will adaptively reconfigure the key operational parameters of the Adaptive Mechanical Vapor Re-compression (MVR) process to use appropriate values for optimized processing based on the composite specific heat and the mass of the input feedstream, the latent heat of the liquid component of the feedstream and the boiling point of that liquid.

REFERENCE

| Signs | Description |
|---|---|
| 1 | Temperature sensor inserted into the heated thermal energy transfer fluid at the exit of the variable flow pump 2. |

| Signs | Description |
|---|---|
| 2 | Submersible thermal energy transfer fluid pump with variable pumping velocity under the management of the control computer. |
| 3 | Thermally conductive inner wall (thermal energy transfer wall) of the evaporation chamber 9; a major component of the dehydrator. |
| 4 | Compressor blade to press the sludge against the thermal transfer wall 3 of the evaporation chamber |
| 5 | Circulating thermal energy transfer fluid exiting the pump 2 after the addition of thermal energy from the heat exchanger/condenser 19 and the electric heating element 16. |
| 6 | Central shaft in the evaporation chamber 9 which is the mount for the auger blade 7, the compressor 4 and the scraper 8. |
| 7 | Auger blade to advance the sludge forward through the evaporation chamber 9. |
| 8 | Scraper/turning blade to lift the compressed sludge from the thermally conductive wall 3 and turn it over in place inside the evaporation chamber 9. |
| 9 | Evaporation chamber, a major component of the dehydrator. |
| 10 | Steam or the liquid component of the feedstream as a vapor exiting the evaporation chamber 9. |
| 11 | The "re-compressor" fan that adds energy to the steam or liquid component of the feedstream as a vapor 10 from the evaporation chamber 9 to raise the dew point. |
| 12 | Pressure sensor measuring the evaporation chamber absolute pressure. |
| 13 | The variable frequency drive instrumented (monitors RPM, voltage and current) motor that is controlled to precisely raise the pressure of the condensation chamber 15. |
| 14 | Thermal transfer fluid that has given up thermal energy and is on its way to the electric heater 16 and the heat exchanger/condenser 19. |
| 15 | Condensation chamber, includes the space between the re-compression fan 11 and the heat exchanger/condenser 19. |
| 16 | The electric heating element for adding thermal energy to the thermal energy transfer fluid as it leaves the thermally conductive walls of the evaporation chamber 9. |
| 17 | Steam or liquid component of the feedstream as a vapor that has been raised in pressure by the "re-compressor" fan 11 to the dew point of the heat exchanger/condenser 19. |
| 18 | Pressure sensor measuring the absolute pressure of the condensation chamber. |
| 19 | Heat exchanger/condenser where the "re-compressed" steam 17 condenses and releases the latent heat picked up at evaporation to the circulating thermal energy transfer fluid 14. |
| 20 | Thermal energy transfer fluid system which includes two passes through the heat exchanger/condenser 19, the electrical heating system 16, the variable flow velocity "in-stream" pump 2 and the insulated outer wall 24 of the evaporation chamber 9 and the highly thermally conductive inner wall 3 of the evaporation chamber 9. |
| 21 | Temperature sensor inserted into the thermal energy transfer fluid at the exit of the evaporation chamber 9. |
| 22 | Condensed liquid component of the feedstream (i.e., condensate) flowing off of the heat exchanger/condenser 19 where the transition from vapor 17 resulted as the thermal energy of evaporation was given up to the thermal transfer fluid 26 and 5. |
| 23 | The over-all system vacuum pump, which has the ability to pump either vapor (e.g., steam) or liquid or both. |
| 24 | The insulated outer wall of the dehydrator. |
| 25 | Valve to separate liquid from vapor and direct each to respective storage (not shown); valve includes liquid volume measurement (i.e. flow rate). |
| 26 | Thermal transfer fluid that has been fully treated with additional thermal energy as controlled by the control computer (not shown), using the method described in FIGS. 5-9, and provided by the electric heating element 16 and the heat exchanger/condenser 19. |
| 27 | Variable-frequency drive and gear reduction motor to power rotation of the central shaft 6. |
| 28 | Temperature sensor inner wall of the evaporation chamber. |
| 29 | Right angle drive and torque sensing power interface between the variable-frequency drive 27 and the central shaft 6. |
| 30 | Vacuum lock rotational wet, granular material feed valve. |
| 31 | Scale measuring effective mass of the input feed material. |
| 32 | Steam or vapor transfer bulkhead passage from the evaporation chamber 9 to the re-compression fan 11 containing the particulate trap (not shown). |
| 33 | Humidity, pressure, mass and temperature sensor pack monitoring the vacuum gate valve and assessing the output material after the dehydration process. |
| 34 | Vacuum lock rotational dry (dehydrated) material exit valve. |
| 36 | Side of the central shaft 6 with an orthogonal view of the sequential row of auger blades 7 arranged to move the feed material forward as the dehydration process proceeds. |
| 38 | Oblique view of the central shaft 6 and the auger blades 7. |
| 40 | Side of the central shaft 6 with an orthogonal view of the sequential row of compressor blades 4 arranged to compress the feed material against the thermally conductive walls 3 as the evaporation process proceeds. |

| Signs | Description |
| --- | --- |
| 41 | Oblique view of the central shaft 6 and the compressor blades 4. |
| 43 | Side of the central shaft 6 with an orthogonal view of the sequential row of scraper/turning blades 8 arranged to scrape and turn the feed material from the thermally conductive walls 3 as the evaporation process proceeds. |
| 44 | Oblique view of the central shaft 6 and the scraper/turning blades 8. |
| 46 | Arrow indicating the direction of rotation which in turn sets the process of unweaving the functions of advancing the material with auger blade 7, compressing the material with the compressor blade 4 and scraping up and turning the materials using scraping blade 8. |

DETAILED DESCRIPTION OF THE INVENTION

The Dehydration System disclosed herein is an applied Adaptive Mechanical Vapor Re-compression (AMVR) system optimized to process semi-solids (i.e., sludge) and thus is an exploitation of the pressure-related changes generally stated in the "Ideal Gas Law" (i.e., PV=nRT). These "Ideal Gas Law" relationships as applied near the boiling point of the liquid component of the various semi-solid or sludge materials are the basis for the apparatus and method revealed herein to minimize energy expenditures in a process to separate or remove the liquid component from the semi-solid or sludge materials.

Inside a heated evaporation chamber, a mechanical auger/compressor/scraper moves the input feedstream material along the walls of the heated evaporation chamber towards the exit in a three-step process. Because the liquid, the liquid-laden semi-solid (sludge) or dry solids have significantly lower thermal conductivities than the material of the walls of the heated evaporation chamber, the auger/compressor/scraper first moves the sludge material forward through the evaporation chamber, then compresses the sludge against the walls of the heated chamber and finally scrapes the material up and turns it over, making it ready for the same process again but further along in the evaporation chamber. This process is repeated with each revolution of the shaft-mounted compressor/auger/scraper trio.

The thermal energy transfer fluid supplies the necessary latent heat to cause the liquid in the input feedstream to change states and vaporize. The recompression fan directly extracts the vapor from the heated evaporation chamber and pushes the vapor into the condensation chamber, which is maintained at a slightly higher pressure, raising the dew point of the condensation chamber significantly vs. the boiling temperature of the evaporation chamber. The pressure differential between the evaporation chamber and the condensation chamber is adaptively controlled by the method as implemented in the control computer. The control program monitors the input feedstream mass per unit time, the associated pressures and temperatures of the evaporation chamber and the condensation chamber and the re-compressor fan motor RPM and current draw in order to compute the specific heat and the latent heat requirements related to the input feedstream composite. Then, according to the method, the control computer adjusts the vacuum pump-controlled absolute pressure and the regulated heat that is applied to the evaporation chamber such that the thermal losses and system-wide inefficiencies in the system are balanced and the capture and return of the specific plus latent heat and the "make-up" heat within the process is optimized.

Because the vapor is compressed to the higher pressure of the condensation chamber (as compared to the evaporation chamber) the dew point is at a higher temperature inside the condensation chamber than the boiling point in the evaporation chamber. The condensation chamber is built using an insulated inner wall. Thus, little heat will be given up when the liquid component of the feedstream as a vapor comes in contact with the insulated walls. But when the vapor comes in contact with the condenser (which is highly thermally conductive and is nominally at the lower temperature of the cooled thermal transfer fluid) the vapor will give up the latent heat of evaporation plus the "make-up" heat of the condensation chamber "dew point" due to the differential pressure to the condenser. The effective thermal coupling of the condenser will heat the thermal energy transfer fluid flowing through the condenser.

Thus the mechanical action of the recompression fan adds energy to the liquid component of the feedstream as a vapor and raises its temperature (i.e., a higher "dew point") such that when the vapor condenses and releases the latent heat, the thermal energy captured is at a higher temperature than the evaporation temperature at which the liquid component of the feedstream became a vapor. In this method, this higher temperature is maintained by adjusting the recompression fan and the thermal management fluid velocity moving the latent heat from the condensation chamber to the evaporation chamber. This cycling or re-cycling of the latent heat reduces the energy demand of the evaporation process by more than 70%.

It is not necessary to the high efficiency method described herein, but an enhancement to the method is the implementation of the recompression fan and all pumps involved in the process such that the thermally dissipating motors are completely contained within the condensation chamber and/or the thermal fluid transfer system. This enables the effective capture of all of the operating thermal losses of the fans and pumps and further enhances the thermal efficiency of the system.

The liquid component of the feedstream as a vapor hitting the condenser will "condense" on the surface of the condenser and give up the latent heat of condensation (vs. the latent heat of evaporation as it became a vapor) plus the energy added by the re-compression fan motor to bring the pressure up to the new "dew point." This recovered waste heat will be moved to the heated thermal energy transfer fluid system where a small amount of additional "make-up" heat may be added by an electric element if the re-compression subsystem is at capacity for existing conditions.

The controller manages this energy balance process by regulating the overall vacuum set by a variable frequency drive liquid ring (or equivalent technology) vacuum pump extracting the non-condensing gases and the condensate from the condensation chamber to set the overall vacuum or absolute pressure levels of the condensation chamber/evaporation chamber system and regulating the fan-type re-compressor located between the evaporation chamber and the condensation chamber.

Figure 1:
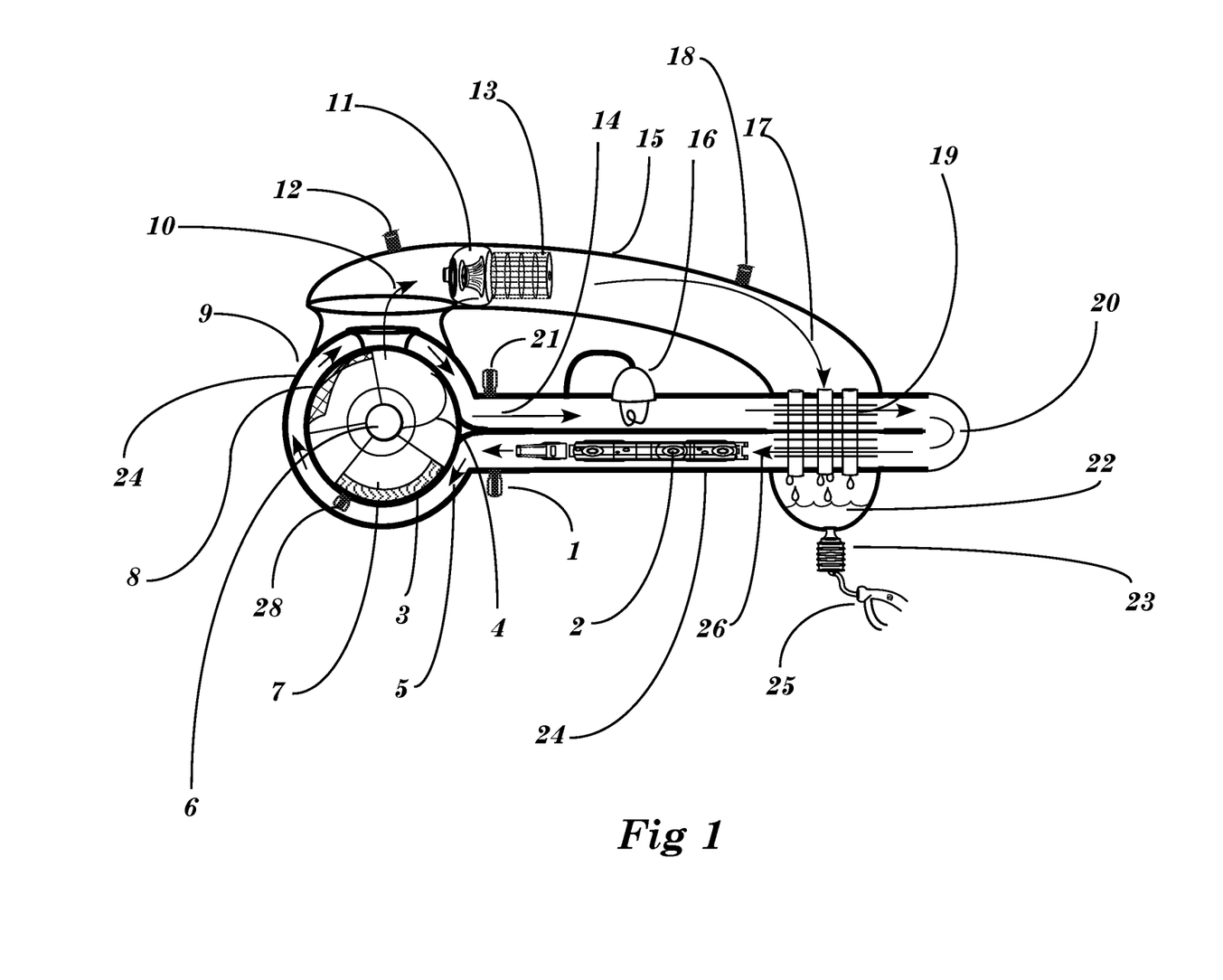
FIG. 1 A diagram which shows the apparatus with an end view of the dehydration chamber, a side view of the vapor transport chamber to the condenser and the thermal energy transfer system fluid ducts between the evaporation and the condensation chambers.
Figure 2:
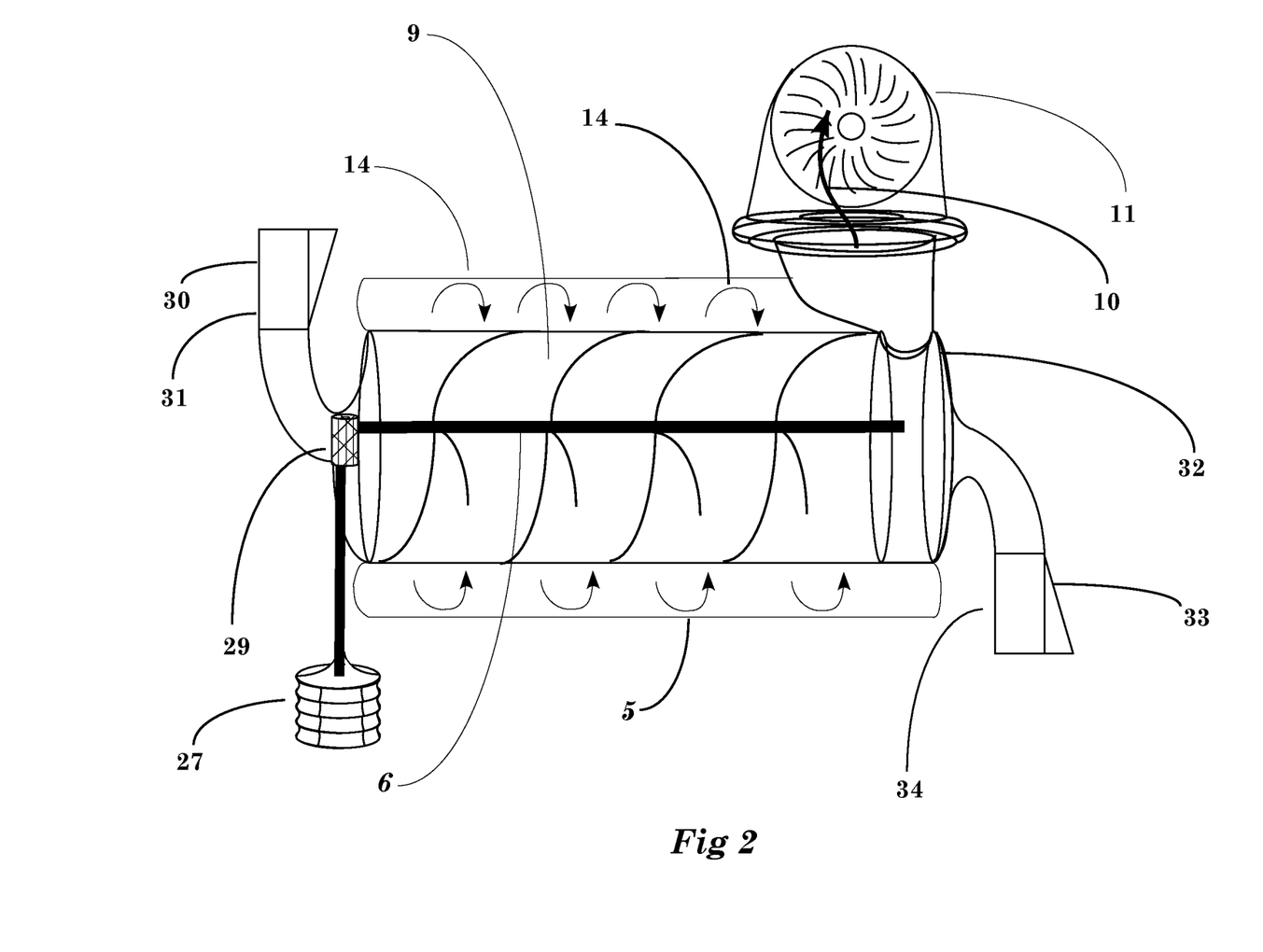
FIG. 2 Side view of the evaporation chamber showing the re-compression fan.
Figure 3:
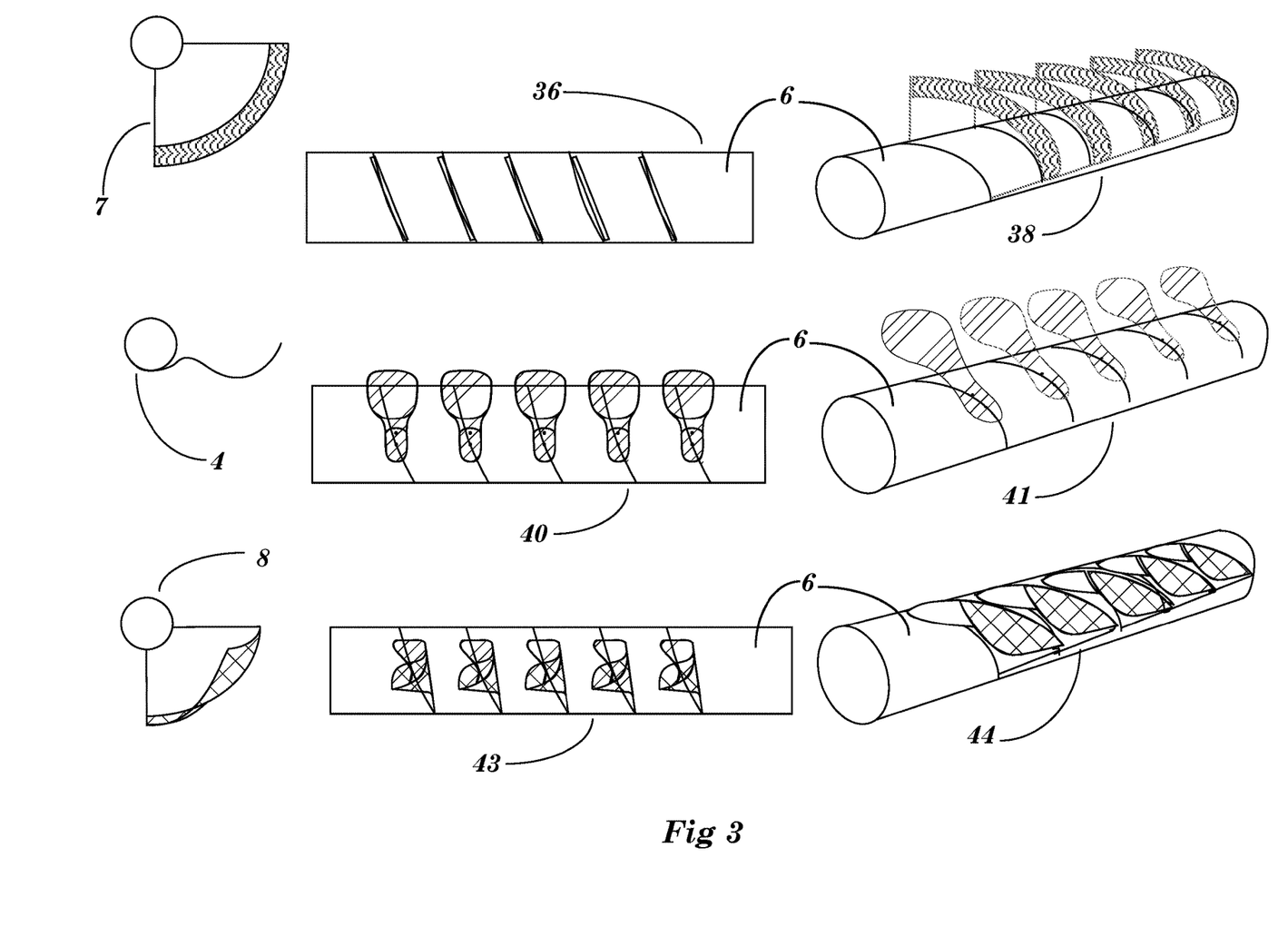
FIG. 3 The shaft-mounted compressor/scraper/auger trio that compresses the feed material against the inside walls of the evaporation chamber, then scrapes the material from the wall and turns the material over in place and finally advances the material forward in the chamber prior to the next compression cycle against the walls of the evaporation chamber.
Figure 4:
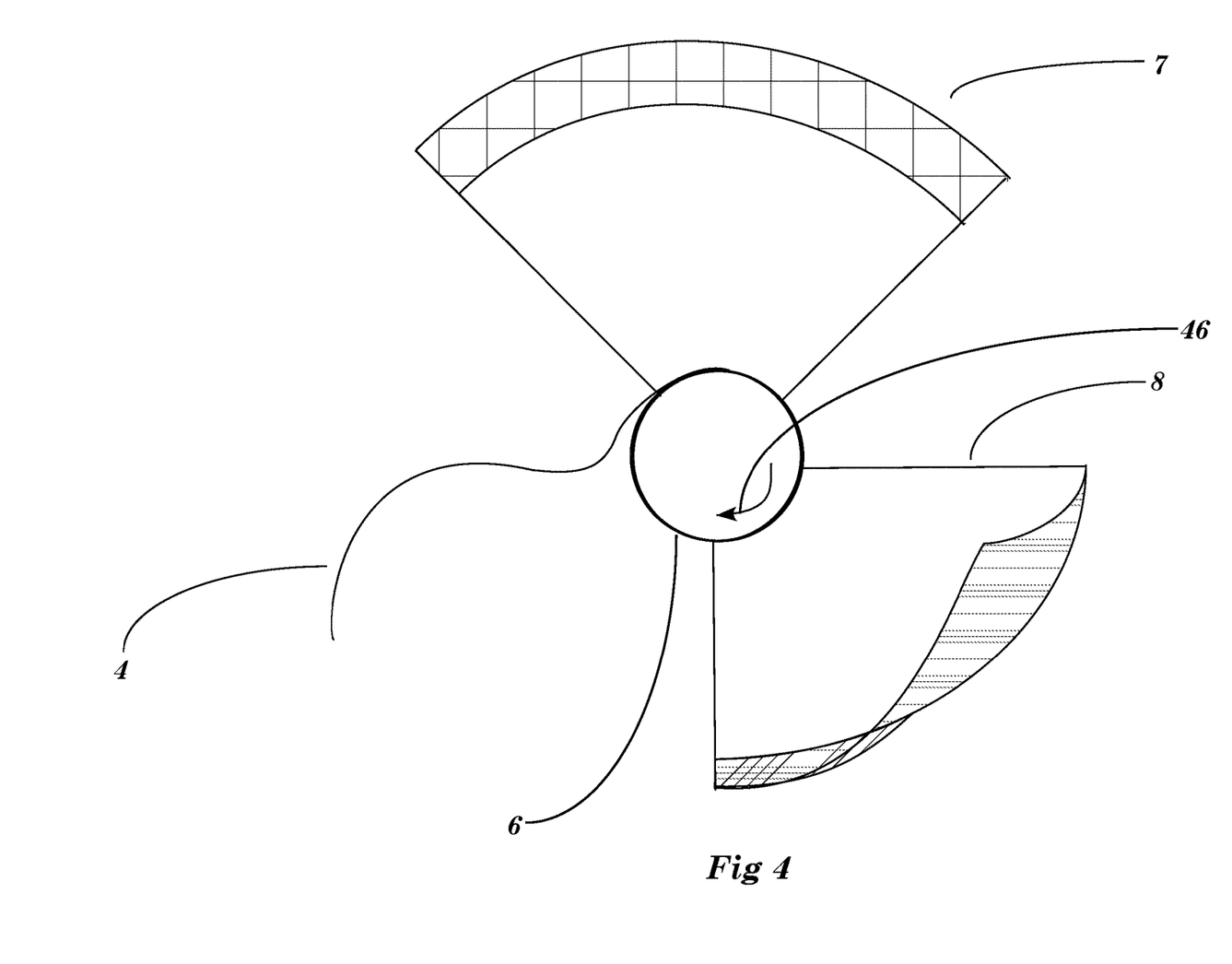
FIG. 4 End view of central shaft 6 showing shaft-mounted compressor/scraper/auger trio.

In a preferred embodiment, whose components are shown in FIGS. 1-4, the system is composed of three major components. The first is the evaporation chamber 9 where the sludge material is dehydrated as a result of the absolute pressure 12 which is set by the overall system vacuum pump 23 and the temperature 1, 21, 28 of the thermal energy transfer fluid 26, 5, 14, driving thermal energy into the highly thermally conductive evaporation inner chamber walls 3. The semi-solid or sludge material is advanced through the input vacuum gate valve 30, where the mass of the input is measured 31 as the material is deposited into the evaporation chamber where the liquid component is converted to vapor 10 and is pulled out of the evaporation chamber 9 by re-compression fan 11 and pushed to the condensation chamber 15. The evaporation chamber 9 is optimized to process sludge of various moisture loads according to the method as controlled by the control computer (not shown). To this end the evaporation chamber 9 is supported by a major rotating shaft 6 which provides mechanical support and rotates the trio of application tools: the compressor blade 4, the scraping-turning blade 8 and the auger blade 7 (as shown in FIG. 3, items 36, 38, 40, 41, 43, 44, these tools are distributed at intervals along the rotating shaft 6, allowing each revolution 46 to compress, scrape and turn the sludge and incrementally move it ahead through the chamber). The operation of these tools is key to the high-efficiency thermal energy transfer to the semi-solid or sludge materials and to the movement of the material physically along through the evaporation process. Rotating shaft 6 is driven by the variable frequency motor 27 through right-angle gear drive 29.

The second major component is the condensation chamber 15, where the vapor 10 produced in the evaporation chamber 9 flows through the bulkhead vent 32 and is compressed to be heated vapor 17 by re-compression fan 11; and the energy provided by the re-compression fan motor 13. This heated vapor 17 is converted to condensate 22 as it is pulled though the condenser by the volume change (i.e., vacuum) as a result of the vapor-to-liquid phase change. The conditioning and the process flow within the condensation chamber are managed according to the method as implemented by the control computer using data supplied by pressure sensor 18 and the temperatures indicated by the thermal energy transfer fluid sensors 1 and 21, which characterize the highly thermally conductive surfaces of the condenser 19.

And finally, the liquid circulatory system 20 of the thermal energy storage and transfer system where thermal energy is moved between the electric heater 16 and the heat exchanger/condenser 19 by the "in-flow" variable velocity pump 2 to flow between the insulated outer wall 24 of the dehydrator and the highly thermally conductive inner wall 3 of the evaporation chamber. This system, according to the method under the management of the control computer, re-circulates the heat of evaporation as the latent heat of condensation with the potential of operating with only the addition of the energy required to support the elevated dew point of the condensation chamber (and thermal losses due to imperfect insulation) as supplied by the re-compression fan motor 13.

The linking component that functionally ties all three major components together in the execution of the prescribed method implementing the AMVR-optimized sludge dehydration process is the system vacuum pump 23 as supported by the material measurement subsystem 1, 21, 28, 31, and 33. This vacuum pump initially removes the existing atmosphere in the evaporation and condensation chambers. During operation, any atmosphere passed by the rotary vacuum valves during the input 30 or output 34 operations will be pulled through the system and discharged by the system vacuum pump 23 through the gas/liquid separation valve 25, and passed to separate bulk storage (not shown). The liquid component as vapor will be converted to condensate and removed from the system by system vacuum pump 23 as a process product from the dehydrator operations. The product liquid will be pushed through the gas/liquid separation valve 25 to bulk storage (not shown).

A Description of the Operating Method

The system exploits thermal conduction through optimal transmission paths involving not only optimized material selection and optimal mechanical design but also a novel physical action to maximize the conductive transfer of thermal energy to the composite semi-solid material (i.e., sludge).

This method is novel, in that it combines the re-circulation of latent heat for efficiency and minimal energy consumption with a physical action to overcome the poor thermal conductivity of typical semi-solid (sludge) composites.

The computer-controlled mechanical systems of the herein described apparatus exploit a procedural method incorporating the Ideal Gas Law relationships to manipulate the temperatures and pressures in a continuous process to dehydrate semi-solid (sludge) materials. The semi-solid materials may include a lot of water or other liquids with a minimal amount of solids which may be aggressively abrasive. Sludge can range in consistency from dirty water to very heavy solids with less than 20% moisture in what might be a very abrasive, gritty semi-solid material.

The incorporated method enhances the process by controlling the absolute pressure at several key regions inside the dehydrator system, optimizing the utility of transporting, storing and delivering heat within the system using a liquid as a thermal storage and thermal transfer medium.

The dehydrator system is a system of tubular constructions featuring an evaporation chamber with an inner wall of highly thermally conductive materials and a system-wide outer wall of highly insulating materials. The evaporation chamber tube is heated with a flow of a thermal transfer fluid flowing from the heat exchanger/condenser and the electric heating element through the jacket formed between the two walls. The flow is controlled by a computer that is monitoring the temperature of the thermal energy transfer fluid at several key points throughout the flow path.

The method uses the control of this optimized construct to move heat through the system to provide the thermal energy required to evaporate the liquid component of the composite input feedstream and then collects this thermal energy for reuse at the condenser where the latent heat of evaporation is collected.

As the liquid portion of the material being dehydrated turns to vapor (e.g. steam), the vapor fills the evaporation chamber and causes a sudden and rapid pressure change. The pressure change is sensed by the control computer through the pressure sensors. Simultaneously with the pressure change, the control computer will sense changes in the fan RPM and the fan motor current.

Prior to vaporization, while the evaporation chamber is at the initial partial pressure, the re-compression fan will be running at the no-load maximum RPM and the minimal current of an unloaded motor. The sudden vaporization will load the motor, slow the RPM and drive up the motor current requirement. In response, the control computer will command the re-compression fan motor to move more vapor, which is pulled through the front bulkhead vent of the evaporation chamber. The vapor is then drawn by the high volume re-compressor fan into the condensation chamber in an attempt to stabilize the differential pressure at the computed value. The control computer monitors the increase in fan motor current and uses the re-compression fan motor performance curve table to directly relate fan motor power, motor RPM and the change in differential pressure to gas volume transferred.

The differential pressure is set by the control program to increase the condensation chamber pressure and thus (by the Ideal Gas Law) the temperature to the effective dew point sufficiently high enough to optimize the additional thermal energy captured in addition to the latent heat by the condenser when the vapor condenses at the elevated dew point. Thus the system adds thermal energy to the vapor in a sufficient amount to compensate for any system losses as it returns the thermal energy to the evaporation chamber for reuse. A high volume particulate trapping vent is built into the flow path through the bulkhead vent.

The control computer tailors the operating parameters to the computed sum of the apparent system losses plus the sum of the specific and latent heat values by using the initial feedstream material's temperature, the mass of the input feedstream material, and the evaporation chamber temperature noted when the sudden pressure spike in the evaporation chamber pressure indicates that the liquid in the input sludge has transformed to vapor (boiled).

Fitted inside the tube is a unique auger/compressor/scraper which, according to the method as implemented by the control computer, advances the material through the tube, then mechanically compresses the material to a thin layer, minimizing the thermal conduction path length, covering a maximum area to be dried against the heated wall of the evaporation chamber and then mechanically scrapes the material off the thermally conductive walls and turns it over. This process is then repeated as each 3-blade set of the auger/compressor/scraper rotates around with the center shaft. This mechanical action constantly moves the material ahead, compresses the material against the heated wall, scrapes the material off the heated wall and turns the material over so that fresh material is directly exposed to the tube wall with each revolution. This is necessary because the thermal conductivity of the evaporation chamber wall is dramatically higher than the liquid or other more solid components of the semi-solid input feed material being dehydrated. The object of the method is to create the minimum depth thermal path with a maximum thermally conducting surface area.

The vapor and any atmosphere induced during the input of feedstream materials through the vacuum lock rotary valve is drawn out of the evaporation chamber by the re-compression fan and pushed through the condensation chamber to make physical contact and pass through the water-cooled heat sink known as the condenser. The condenser quickly pulls the heat out of the vapor, converting the vapor to condensate. The condensate, along with any collected atmospheric gas, then flows down to a sump where a liquid ring or similar vacuum pump pulls the condensate and any atmospheric gas from the sump and discharges through a gas/liquid separation valve to respective external storage facilities. The vacuum pump is used by the control computer to remove the condensate as it forms and any induced atmospheric gas to set the overall internal pressure for the dehydrator system.

The dehydrated product exits through a vacuum lock rotational valve. While the processed dry product is in the vacuum-locked chamber of the rotating valve, the control computer collects data on the mass of the material as well as the moisture content. The control computer uses the cycle time, input and output mass measurements, the output humidity, the differential pressures and temperatures to compute the actual specific heat plus latent heat of the input composite feedstream materials. The calculated specific plus latent heat of the input feedstream materials are used by the method to adaptively control the continuous process differential pressure of the dehydrator to optimize the energy consumption and throughput efficiency.

Following is an example of the Method as shown in the process flow diagrams of FIGS. 5-9.

Figure 5:
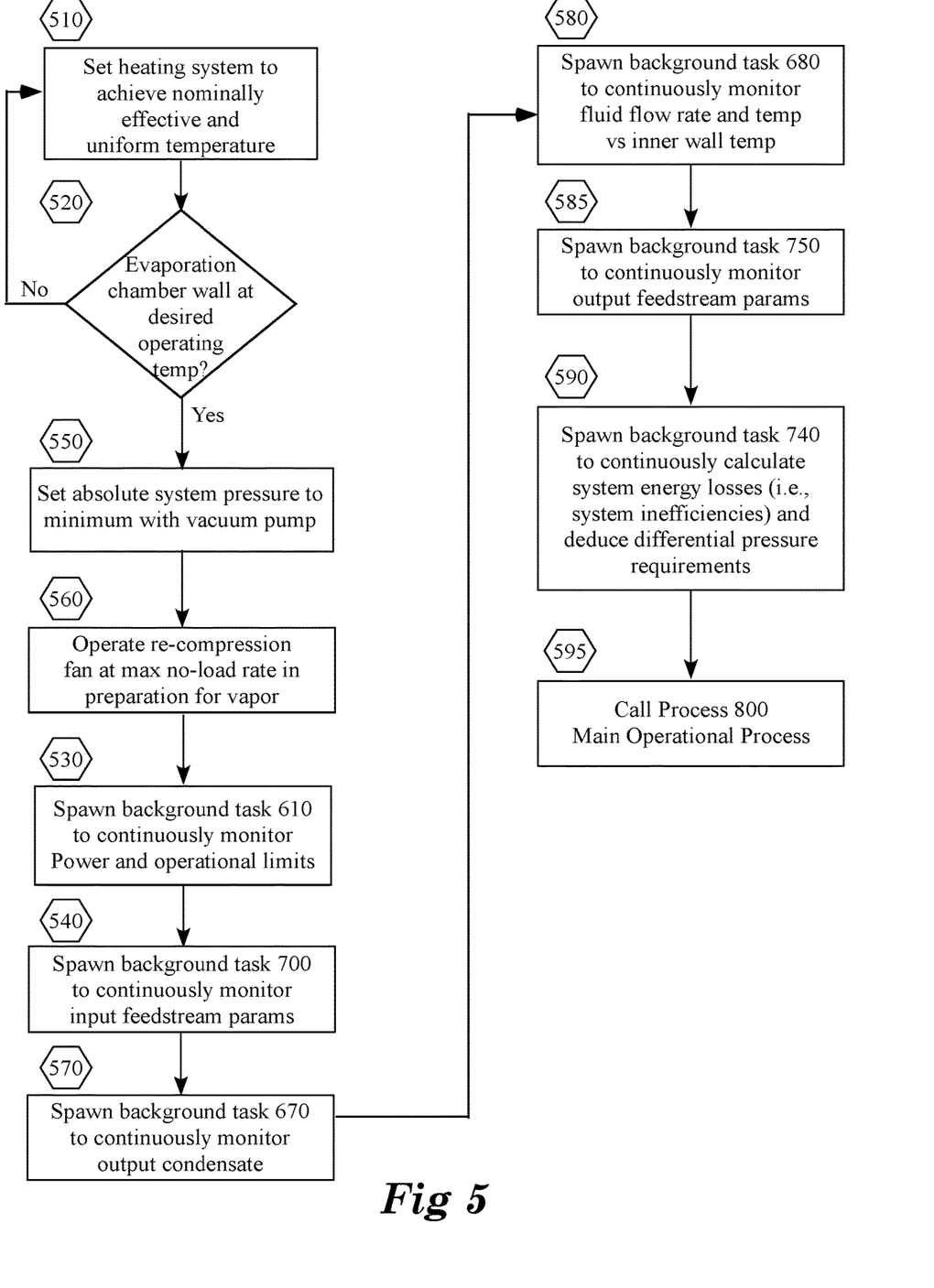
FIG. 5 Process flow for the Method disclosed herein. This diagram shows the steps to initially start the system prior to any feedstream input and to spawn the background tasks which will continuously monitor system performance.

The system is initialized 510 by heating the evaporation chamber wall to the operating temperature 520 and minimizing the chamber pressure 550. The re-compression fan is set to a maximum "no-load" condition 560 in anticipation of feedstream vaporization.

Figure 6:
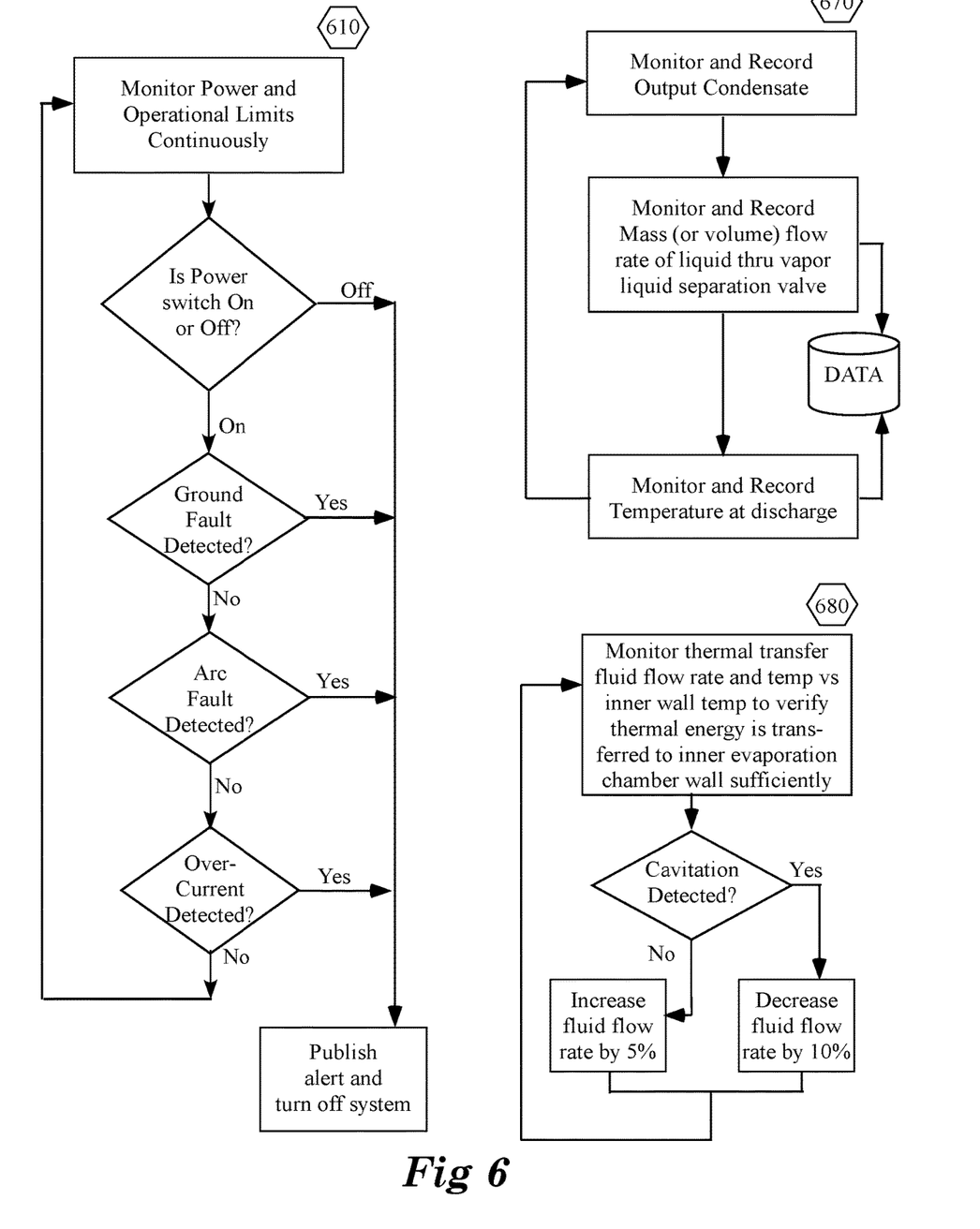
FIG. 6 Process flow for the Method disclosed herein. This figure shows steps for 3 of the background processes: monitoring power and operational limits; monitoring and recording parameters of output condensate; monitoring thermal transfer fluid flow and adjust flow rate if errors or cavitation are detected.
Figure 7:
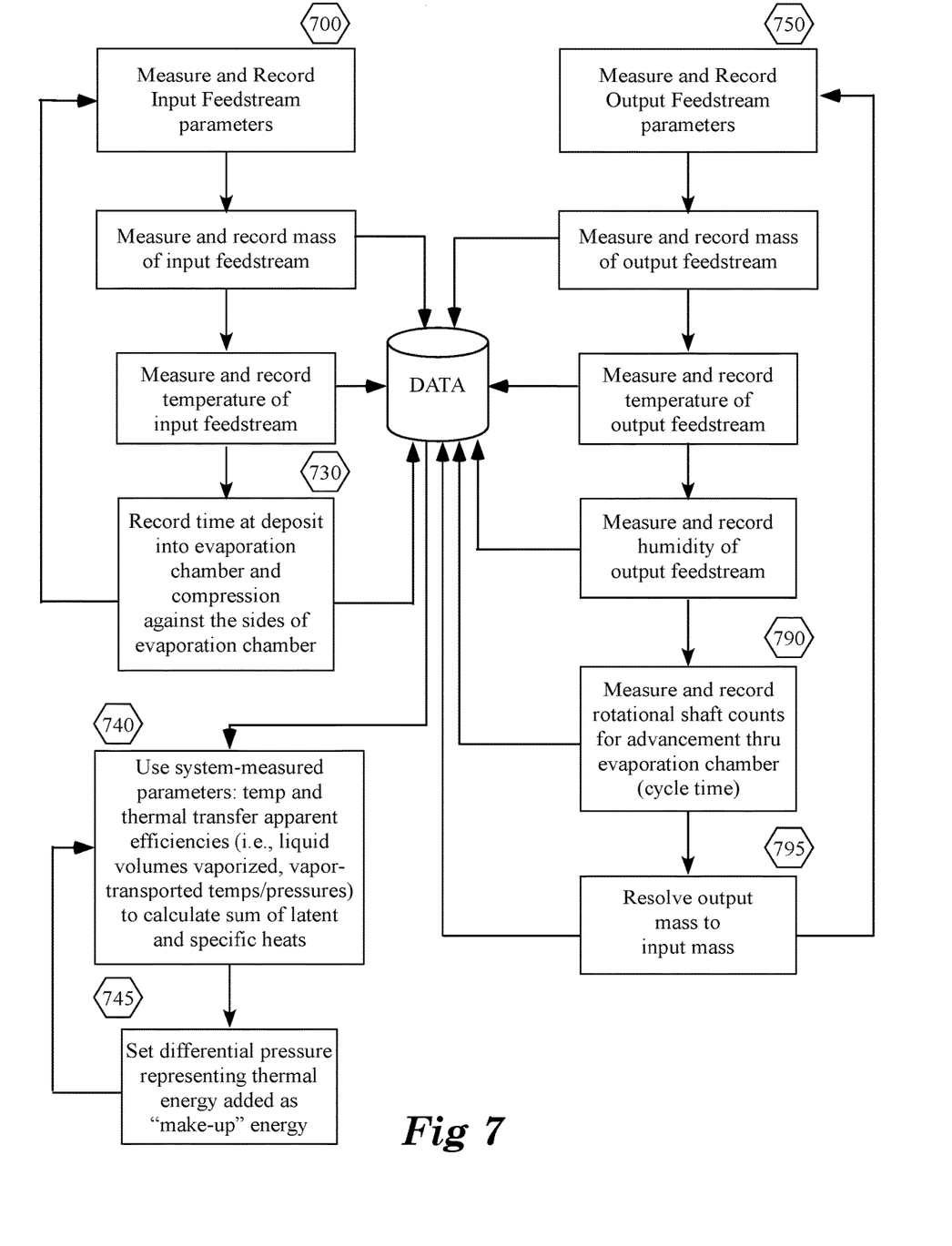
FIG. 7 Process flow for the Method disclosed herein. This figure shows steps for 3 background processes: measuring and recording parameters for input feedstream; measuring and recording parameters for output materials; calculating the sum of latent and specific heat of the input feedstream to set differential pressure to add "make-up" energy.

Background tasks 610, 710, 670, 700, 670, 680, 740 and 750 are called from the main processes 560, 530, 540, 570, 580, 585, 590. These background tasks monitor the power circuits of the system 610, the input and output feed-streams 670, 700 and 750, while the system optimizes the energy transfer process of the controlling method 680. Background tasks collect operating performance data 730, 790 and 795 which are used by the system as a basis for enabling optimization and confirming system operation. Background task 740 uses the measured system performance and the calculated characteristics of the input feedstream to set the differential pressure, representing the "make-up" energy required to compensate for system-wide inefficiencies and thermal losses.

Figure 8:
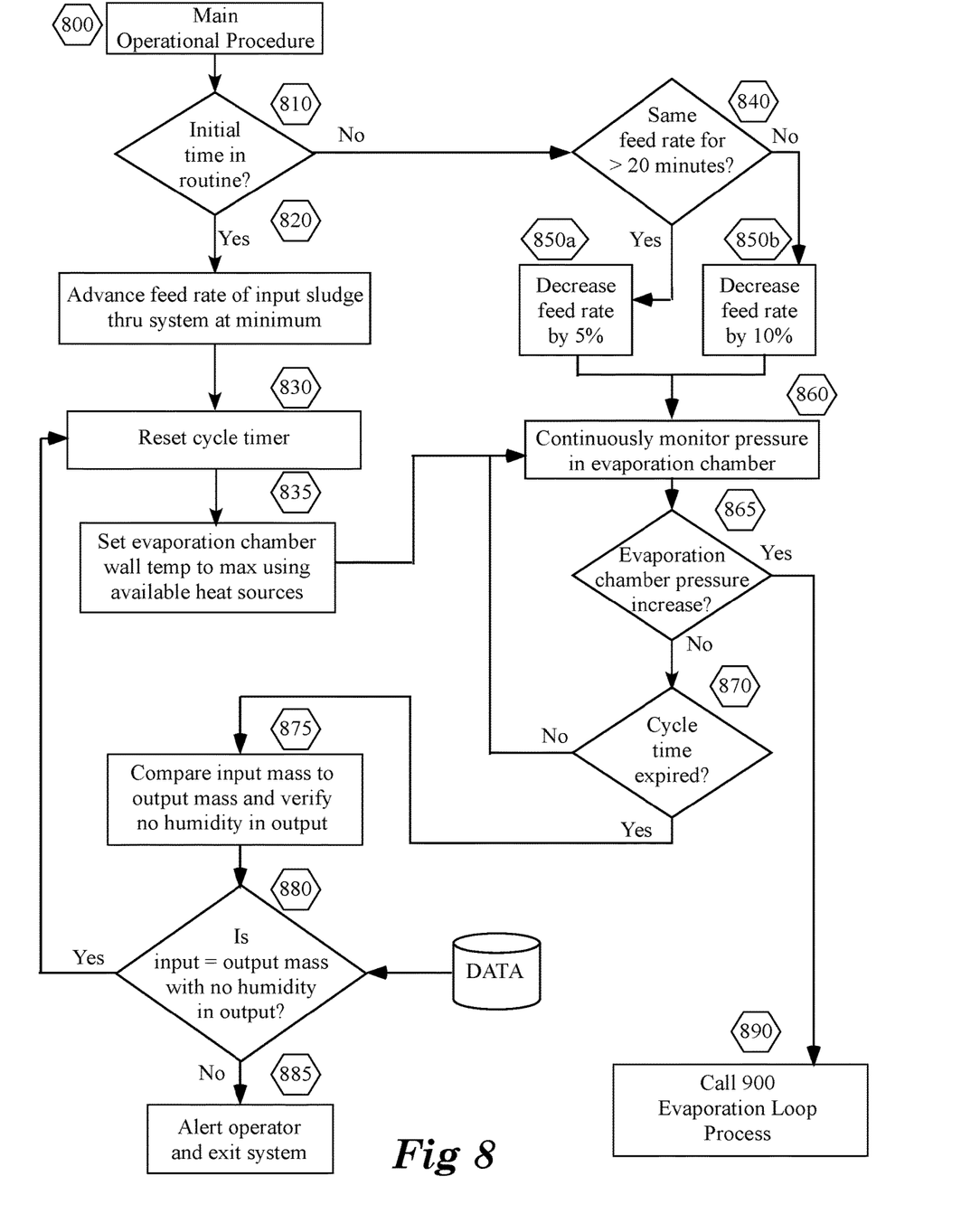
FIG. 8 Process flow for the Method disclosed herein. This figure shows the Main Operational Procedure for monitoring the system to detect the point at which the liquid component of the input feedstream turns to vapor and the system can move into the Evaporation Process Loop.

After the initialization loop is fully activated, including the background monitoring and measuring the operational activities, program pint 595 transfers control to the Main Operational Procedure 800. In the Main Operational Procedure, the system is initialized to provide input feedstream material at a minimum rate 820 while the thermal energy transfer processes are initialized to a maximum 835.

This is an effort to monitor 860 the forced vaporization 865 of the input feedstream material within the system designed feedstream process exposure time, i.e. "cycle time" 870. The system will loop moving feedstream material at the minimum rate of advance while exposing the material to the maximum thermal energy in an effort to vaporize the liquid component of the feedstream 865. If there is no liquid component, the system will verify no operational errors by comparing the input feedstream to the output feedstream 880, reset the cycle timer 830, verify the maximum applied thermal energy 835 and continue to monitor for vaporization 860. If there is no vaporization because an error is detected an alert is sent to the operator and the system exits 885.

Figure 9:
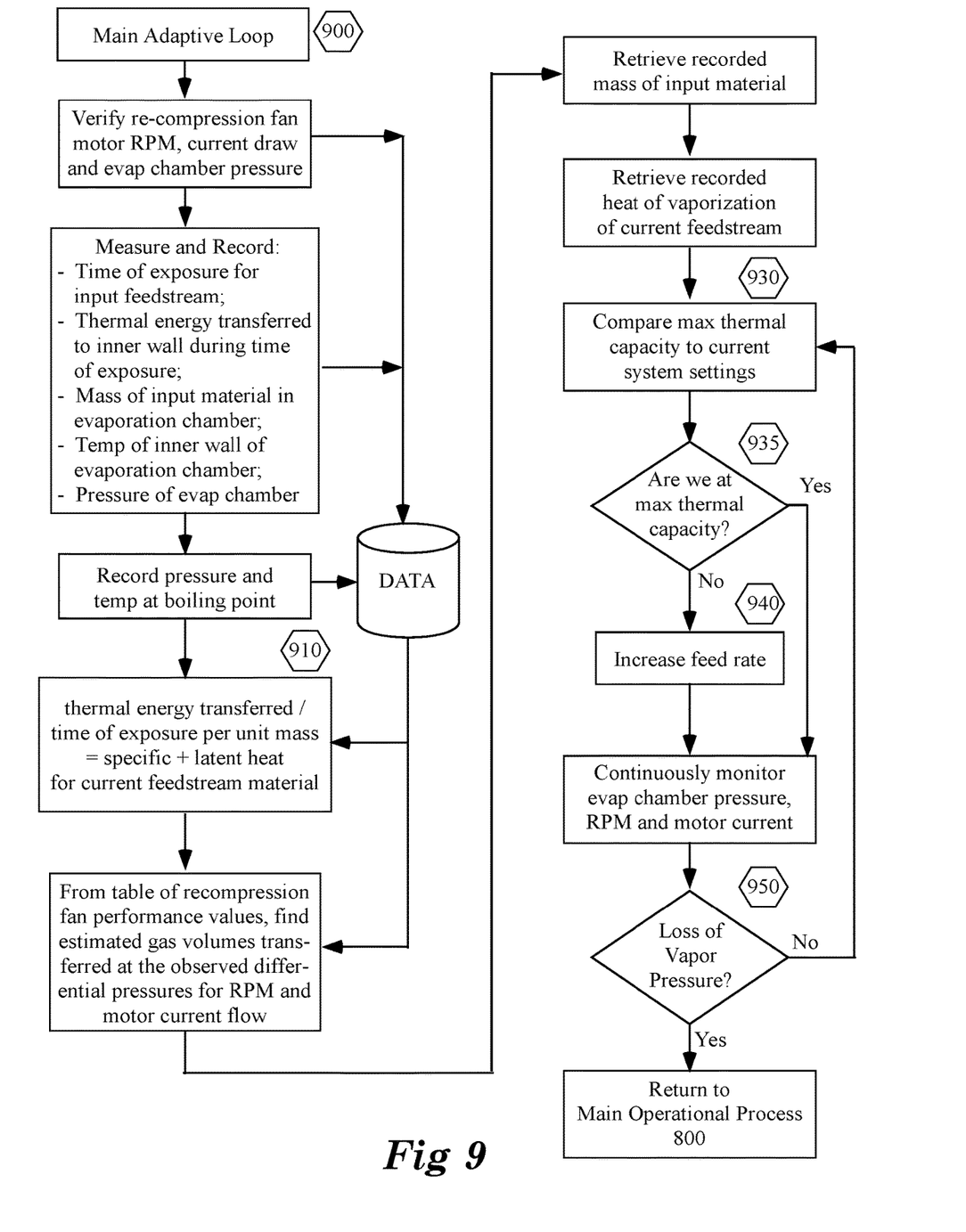
FIG. 9 Process flow for the Method disclosed herein. This figure shows the Evaporation Process Loop, which monitors and controls the system during the evaporation process; monitoring and adapting parameters to maintain the system at optimal thermal capacity.

If vaporization is detected, the system transfers control 865 to the main adaptive loop 900. In the main adaptive loop, the specific plus latent heating value is measured as the thermal energy transferred divided by the time of exposure per unit mass 910 as the feedstream materials vaporize. The system collects performance data 930 while incrementally adapting the operational performance to maximum capability of the system 935.

If the transformation of the liquid component to vapor ceases 950, then the system will return to the adaptive step of the Main Operational Procedure and incrementally increase (depending on the total continuously operating process elapsed time) the thermal energy exposure time by slowing the feed rate (i.e., advance rate of input sludge through the system) 850a and 850b. Longer continuous runs will take smaller corrective steps 850a while short runs will take larger corrective steps 850b as an indication that shorter runs will characterize inconsistent feedstreams.

Similar to the above described process for wet waste streams, there are food preparation processes and industrial processes such as the manufacture of many types of pharmaceuticals that are wet and need to be dehydrated with a minimum of heating, or processed below certain temperatures, which could be processed through this apparatus using the prescribed method.

In the application of this improved method to the processing of water-laden waste streams, the recovered water and the dry material are treated with both Ultra Violet light and Corona injection of electric discharge-produced free radicals to kill pathogens and break down residual organics as a means of odor reduction and to ensure sterility.

What is claimed:

1. A method for removing moisture from sludge using a vapor recompression system, the method comprising:
   introducing sludge into an evaporation chamber, the sludge including a solid component and a moisture component;
   agitating the sludge within the evaporation chamber;
   evaporating a portion of the moisture from the sludge in the evaporation chamber into a vapor component;
   conveying the vapor component from the evaporation chamber into a condensation chamber;
   compressing the vapor component in the condensation chamber to produce a heated vapor;
   removing heat from the heated vapor to produce a liquid condensate;
   removing the liquid condensate from the condensation chamber; and
   providing the heat from the heated vapor to the evaporation chamber.

2. The method of claim 1, wherein compressing the vapor component is performed by a compressor comprising at least one of a pump or fan disposed between the evaporation chamber and the condensation chamber.

3. The method of claim 1, wherein the heat from the heated vapor is transferred to the evaporation chamber by a heat transfer fluid.

4. The method of claim 3, wherein the heat is removed from the heated vapor by a heat exchanger disposed in the condensation chamber.

5. The method of claim 4, creating a negative pressure in the condensation chamber to draw the heated vapor across the heat exchanger.

6. The method of claim 4, wherein the heat exchanger transfers heat from the condensed fluid to the heat transfer fluid, the method further comprising:
   circulating the heat transfer fluid to the evaporation chamber; and
   transferring heat from the heat transfer fluid to a sidewall of the evaporation chamber.

7. The method of claim 1, wherein agitating the sludge comprises pressing the sludge against a sidewall of the evaporation chamber to transfer heat from the sidewall of the evaporation chamber to the sludge.

8. The method of claim 7, wherein agitating the sludge further comprises scraping the pressed sludge from the wall and turning over the sludge.

9. The method of claim 1, wherein removing the liquid condensate from the condensation chamber comprises removing the liquid condensate and gas by a vacuum pump.

10. The method of claim 9, further comprising:
    evacuating atmosphere from the evaporation and condensation chambers by the vacuum pump.

11. The method of claim 1, further comprising sterilizing the sludge by converting moisture in micro-organisms contained in the sludge to vapor.

12. A dehydrator for removing water from sludge, the dehydrator comprising:
    an evaporation chamber;
    an agitator disposed in the evaporation chamber;
    a condensation chamber coupled to the evaporation chamber;
    a heat exchanger disposed in the condensation chamber;
    a compressor disposed between the evaporation chamber and the heat exchanger; and
    a heat transfer fluid thermally coupled between the heat exchanger and the evaporation chamber,
    wherein the compressor introduces heat to water vapor evaporated from the sludge in the evaporation chamber.

13. The dehydrator of claim 12, wherein the heat transfer fluid is contained in a circulation path that runs around the evaporation chamber so that heat from the heat transfer fluid is transferred from the heat exchanger to the evaporation chamber.

14. The dehydrator of claim 13, wherein the evaporation chamber is a cylindrical chamber, and the circulation path approaches a first side of the cylindrical chamber, runs around the cylindrical chamber, and leaves the cylindrical chamber from the first side.

15. The dehydrator of claim 12, wherein the agitator comprises at least one compression blade that is configured to compress the sludge against a sidewall of the evaporation chamber.

16. The dehydrator of claim 15, wherein the agitator further comprises a scraper blade that is configured to scrape the compressed sludge off of the sidewall.

17. The dehydrator of claim 12, further comprising:
    a vacuum pump disposed in the condensation chamber.

18. The dehydrator of claim 17, wherein the vacuum pump is disposed at a base of the condensation chamber and is coupled to a liquid/vapor separation valve.

19. The dehydrator of claim 18, wherein the heat exchanger is disposed above the vacuum pump so that the vacuum pump draws compressed vapor across the heat exchanger.

20. The dehydrator of claim 12, further comprising a pump and a heater disposed in a path of the heat transfer fluid, wherein the heater is configured to heat the heat transfer fluid and the pump is configured to circulate the heat transfer fluid between the heat exchanger and the evaporation chamber.

* * * * *

UNITED STATES PATENT AND TRADEMARK OFFICE
CERTIFICATE OF CORRECTION

PATENT NO.       : 10,682,585 B2
APPLICATION NO.  : 15/648008
DATED            : June 16, 2020
INVENTOR(S)      : James William Masten, Jr.

It is certified that error appears in the above-identified patent and that said Letters Patent is hereby corrected as shown below:

On the Title Page

Add the following text:
--Related U.S. Application Data
(60) Provisional application No. 62/361,284, filed on Jul. 12, 2016.--

Signed and Sealed this
Twenty-eighth Day of July, 2020

Andrei Iancu
*Director of the United States Patent and Trademark Office*